United States Patent
Grubwinkler

(10) Patent No.: US 12,090,886 B2
(45) Date of Patent: Sep. 17, 2024

(54) METHOD AND BACK END DEVICE FOR PREDICTIVELY CONTROLLING A CHARGING PROCESS FOR AN ELECTRIC ENERGY STORE OF A MOTOR VEHICLE

(71) Applicant: Vitesco Technologies GmbH, Hannover (DE)

(72) Inventor: Stefan Grubwinkler, Munich (DE)

(73) Assignee: Vitesco Technologies GmbH, Regensburg (DE)

(*) Notice: Subject to any disclaimer, the term of this patent is extended or adjusted under 35 U.S.C. 154(b) by 644 days.

(21) Appl. No.: 17/283,792

(22) PCT Filed: Oct. 9, 2019

(86) PCT No.: PCT/EP2019/077297
§ 371 (c)(1),
(2) Date: Apr. 8, 2021

(87) PCT Pub. No.: WO2020/074554
PCT Pub. Date: Apr. 16, 2020

(65) Prior Publication Data
US 2021/0387546 A1 Dec. 16, 2021

(30) Foreign Application Priority Data
Oct. 11, 2018 (DE) ............. 10 2018 217 454.7

(51) Int. Cl.
*H02J 7/00* (2006.01)
*B60L 53/67* (2019.01)
(Continued)

(52) U.S. Cl.
CPC ............. *B60L 58/12* (2019.02); *B60L 53/67* (2019.02); *B60L 53/68* (2019.02); *H02J 7/0048* (2020.01); *H02J 2310/48* (2020.01)

(58) Field of Classification Search
CPC .... H02J 3/381; H02J 2300/24; H02J 2300/20; H02J 2300/28; H02J 3/00; H02J 1/102;
(Continued)

(56) References Cited

U.S. PATENT DOCUMENTS

| 7,934,573 B2* | 5/2011 | Fassnacht ................ B60K 6/48 320/132 |
| 8,768,616 B2 | 7/2014 | Kristinsson et al. |

(Continued)

FOREIGN PATENT DOCUMENTS

| CN | 102217164 A | 10/2011 |
| CN | 102333667 A | 1/2012 |

(Continued)

OTHER PUBLICATIONS

Chinese Office Action with Search Report for Chinese Application No. 201980066918.7, dated May 17, 2023 with translation, 11 pages.

(Continued)

*Primary Examiner* — Binh C Tat
(74) *Attorney, Agent, or Firm* — Buchanan, Ingersoll & Rooney PC

(57) ABSTRACT

A method for predictive charging control for an electrical energy store of a motor vehicle, wherein an energy exchange between the energy store and an electrical energy source is controlled by a charging device. This provides that a future time profile of a non-energy requirement resulting from a respective parking phase of the motor vehicle is predicted and, independently of an availability of a charging power of the energy source, a state of charge of the energy store is kept below a limit value by the charging device if the predicted time profile of the non-energy requirement satisfies a predetermined rest criterion for a predetermined next time interval.

16 Claims, 4 Drawing Sheets

(51) Int. Cl.
 B60L 53/68 (2019.01)
 B60L 58/12 (2019.01)

(58) Field of Classification Search
 CPC .. H02J 15/00; H02J 3/04; H02J 7/0048; H02J 7/0068; H02J 2207/40; H02J 2310/48; H02J 7/342; H02J 13/00002; H02J 2310/12; H02J 3/003; H02J 3/32; H02J 7/00712; H02J 3/004; H02J 3/322; H02J 3/466; H02J 7/0013; H02J 13/00032; H02J 2300/10; H02J 2300/40; H02J 2310/10; H02J 3/06; H02J 3/14; H02J 3/34; H02J 7/00032; H02J 7/35; H02J 13/00001; H02J 13/00034; H02J 2310/14; H02J 3/008; H02J 3/144; H02J 7/0029; H02J 1/106; H02J 13/00006; H02J 13/00022; H02J 2300/22; H02J 3/38; H02J 3/472; H02J 3/48; H02J 50/90; H02J 7/0045; H02J 7/0047; H02J 7/14; H02J 7/1423; H02J 7/1438; H02J 13/00004; H02J 13/00024; H02J 13/00028; H02J 2203/20; H02J 2310/60; H02J 2310/64; H02J 2310/66; H02J 3/0075; H02J 7/00034; H02J 7/0014; H02J 7/0042; H02J 7/005; H02J 7/0063; H02J 7/0069; H02J 7/007; H02J 7/0071; H02J 7/02; H02J 7/345; H02J 9/002; H02J 50/12; H02J 50/10; H02J 50/70; H02J 50/80; H02J 7/00045; H02J 7/0031; H02J 3/001; H01M 8/04037; H01M 8/04029; H01M 8/04052; H01M 8/04074; H01M 10/48; H01M 2220/20; B60G 2300/60; B60L 53/12; B60L 53/65; B60L 58/22; B60L 7/12; B60L 15/2045; B60L 53/57; B60L 53/62
 USPC ................................................ 320/106–115
 See application file for complete search history.

(56) References Cited

U.S. PATENT DOCUMENTS 9,043,262 B2   5/2015   Sera
 9,499,157 B2  11/2016   Muller et al.
 2007/0150174 A1  6/2007   Seymour et al.
 2013/0073607 A1  3/2013   Sera
 2013/0179070 A1  7/2013   Kristinsson et al.
 2015/0239365 A1*  8/2015   Hyde ...................... B60L 58/26
                                                        701/2
 2018/0281597 A1* 10/2018   Herb ..................... B60L 3/0084

FOREIGN PATENT DOCUMENTS

| CN | 105270392 A    | 1/2016  |
| CN | 107180272 A    | 9/2017  |
| DE | 102011078946 A1 | 1/2013  |
| DE | 102012209645 A1 | 12/2013 |
| DE | 102014200315 A1 | 7/2015  |
| DE | 102014213075 A1 | 1/2016  |
| EP | 2042833 A1     | 4/2009  |
| EP | 3016235 A1     | 5/2016  |
| WO | 2010056488 A1  | 5/2010  |
| WO | 2013182382 A2  | 12/2013 |

OTHER PUBLICATIONS

European Examination Report for European Application No. 19 795 458.9, dated Aug. 9, 2022, with translation, 6 pages.
Karlsson, M.A. I.C., "Patterns of Use, Perceived Benefits and Reported Effects of Access to Navigation Support Systems: An Inter-European Field Operational Test," Feb. 20, 2015, vol. 9(8), pp. 802-809, ISSN 1751-956X, Iet Intelligent Transport Systems, The Institution of Engineering and Technology.
Keil, P., "Aging of Lithium-Ion Batteries in Electric Vehicles," Dissertation, Jul. 2017, 178 pages, Technical University München.
International Search Report and Written Opinion for International Application No. PCT/EP2019/077297, mailed Feb. 3, 2020, with partial English translation, 7 pages.
International Search Report and Written Opinion for International Application No. PCT/EP2019/077297, mailed Feb. 3, 2020, 12 pages (German).
German Examination Report for German Application No. 10 2018 217 454.7, dated Jul. 19, 2019, 6 pages.
Office Action (Communication pursuant to Article 94(3) EPC) issued Jun. 26, 2024, by the European Patent Office in corresponding European Patent Application No. 19 795 458.9-1009 and an English machine translation of the Office.

* cited by examiner

METHOD AND BACK END DEVICE FOR PREDICTIVELY CONTROLLING A CHARGING PROCESS FOR AN ELECTRIC ENERGY STORE OF A MOTOR VEHICLE

CROSS REFERENCE TO RELATED APPLICATIONS

This application is the U.S. National Phase Application of PCT International Application No. PCT/EP2019/077297, filed Oct. 9, 2019, which claims priority to German Patent Application No. 10 2018 217 454.7, filed Oct. 11, 2018, the contents of such applications being incorporated by reference herein.

FIELD OF THE INVENTION

The invention relates to a method and a backend apparatus for predictive charging control for an electrical energy store of an electrically drivable motor vehicle. The charging control is intended to ensure gentle operation of the electrical energy store.

BACKGROUND OF THE INVENTION

A battery with lithium-ion battery cells, for example, can be provided here as the energy store. The aging or the wear of lithium-ion battery cells depends on the temperatures and the state of charge (SOC) of the battery. Lithium-ion batteries should thus be stored below 10 degrees Celsius and at a medium (30-50%) or even low SOC (0-30%). Under these storage conditions, the available battery capacity is reduced by less than 10% in 15 years, which is very beneficial.

However, when the state of charge is reduced, the available range of a motor vehicle is likewise reduced. There are approaches that learn the destination of a journey on the basis of previous journeys and, for example, output the probable destination or the probable path to the destination (most probable path). Examples are US 20070150174 A1, U.S. Pat. No. 8,768,616 B2, EP 2 042 833 A1, DE 10 2011 078 946 A1, each incorporated herein by reference. These methods have the disadvantage that in some cases they only determine the journey destination during the journey as a function of the first road segments traveled on. However, this is too late to keep the energy store at a low SOC (state of charge) level because it is then no longer possible to adapt the state of charge by means of a charging device.

SUMMARY OF THE INVENTION

An aspect of the invention is based on the object of providing charging control for an electrical energy store of a motor vehicle, wherein the charging control is intended to enable the energy store to be operated gently.

An aspect of the invention provides a method for predictive charging control for an electrical energy store of an (electrically drivable) motor vehicle. The method proceeds from the fact that an energy exchange between the energy store and an electrical energy source can be controlled by a charging device. The energy source can be an electricity grid, for example a public electricity grid, that is to say an energy supply grid. The charging device can have a terminal via which the energy store of the motor vehicle can be connected to the energy source. An energy exchange or energy flow between the electricity grid and the energy store can be controlled here by the charging device. The charging device can be designed as a stationary device, for example as a charging station, or as a charger for the motor vehicle. The question now is when and how much energy is loaded into the energy store by the charging device or fed into the electricity grid from the energy store, that is to say which state of charge (SOC) should be set for gentle operation of the energy store.

According to the method, a future time profile of a non-energy requirement is predicted or forecast. Said non-energy requirement results from a respective parking phase or resting phase of the motor vehicle. The non-energy requirement can be, for example, that period of time during which the motor vehicle is coupled to the energy source via the charging device. In other words, there is always a non-energy requirement when the motor vehicle is not being driven. Said time profile of the non-energy requirement can thus indicate that the motor vehicle is coupled or connected to the charging device, that is to say when the energy exchange by means of the charging device is possible.

The method now provides that a state of charge of the energy store is kept below a limit value by means of the charging device if the predicted time profile of the non-energy requirement satisfies a predetermined rest criterion for a predetermined next time interval. It is therefore taken into account when no energy is required from the energy store according to the time profile of the non-energy requirement, which is expressed by the fact that the predicted time profile of the non-energy requirement satisfies the predetermined rest criterion for the predetermined next time interval. Said time interval can mean, for example, that the rest criterion will be satisfied for the next minute or the next hour, based on the point in time considered. However, the time interval can also be 0 seconds, which means that only the point in time currently under consideration is taken into account. The rest criterion can state here that the motor vehicle is not required, that is to say that no energy from the energy store is required. For example, it can be specified as a rest criterion that the time profile of the non-energy requirement lies above a predetermined threshold value. The considered time interval can be selected here in such a way that a charging duration that may be necessary to charge the energy store can be taken into account so that, in the event that the rest criterion is no longer satisfied at a predetermined future point in time according to the predicted time profile, then the energy storage is also charged.

That is to say that while the motor vehicle is coupled to the charging device, the non-energy requirement can be determined during this time on the basis of a future time profile, that is to say it is possible to monitor or estimate or predict how long the motor vehicle will be without an energy requirement, that is to say remain unused and/or remain coupled to the charging device. The state of charge can then be kept below the limit value for this time. It should be noted here that the state of charge can be kept below the limit value regardless of which charging power is available in the electricity grid. In other words, the state of charge thus does not need to be kept below the limit value because no charging power is currently available from the energy source and/or because at least one other motor vehicle is to be charged first and the total charging power is to be kept below a threshold value. Instead, the state of charge of the energy store can be kept below the limit value regardless of the availability of the charging power of the energy source. The focus is on extending the service life of the energy store. However, if the energy store is to be integrated into a larger grid (for example low-voltage grid) consisting of a plurality of energy stores with time-dependent electricity prices, the benefit between service life and cost savings can be weighed up and the charging process can additionally therefore also be postponed. The limit value here preferably lies below 70% based on the fully charged state (100% state of charge), in particular below 60% below the fully charged state of charge. The limit value can also be set, for example, as a function of an ambient temperature of the energy store and/or of the motor vehicle, which has already been described as advantageous at the beginning.

Thus, while it is connected to the charging device, the motor vehicle is not unnecessarily burdened to the effect that the energy store has a state of charge that promotes the wear of the energy store. Only when it is recognized on the basis of the predicted time profile of the non-energy requirement that the rest criterion will be infringed in the future or, conversely, that the non-energy requirement ends (and there is thus an energy requirement because the parking phase ends), can a charging process or energy exchange be started in order to prepare the energy store for the end of the parking phase or rest phase. Depending on when the rest criterion will be infringed in the future, a start of a charging process can be specified, for example. The available and/or specified charging power and/or the current state of charge can also be taken into account here.

The invention also encompasses embodiments that afford additional advantages.

In one embodiment, said predicted time profile of the non-energy requirement for respective points in time of the time profile indicates that the motor vehicle does not require any electrical energy from the energy store for a predetermined next period of time based on the respective point in time t and/or will remain coupled to the charging device and/or the energy source. Said next period of time, calculated from the respective point in time t, can, for example, be in a range from 1 minute to 1 hour, for example within 1 minute to 30 minutes. The time profile thus indicates at the respective points in time t whether the motor vehicle will continue to require no electrical energy from the energy store, specifically for the next said predetermined period of time (for example 10 minutes), and/or whether the motor vehicle will continue to remain coupled to the charging device for said period of time. For an exclusive consideration of the respective current point in time, the considered period of time can also be 0 minutes. Therefore, the time profile of the non-energy requirement for different points in time in each case indicates whether the motor vehicle will still be available for an energy exchange.

If the motor vehicle is connected to the charging device and the energy store is discharged to such an extent that the state of charge lies below said limit value, the charging device can simply remain deactivated and/or the energy exchange can be omitted for as long as the time profile of the non-energy requirement satisfies the rest criterion. It can of course be provided here that, in the event that the energy store is discharged below a predetermined minimum state of charge, at least the minimum state of charge is restored by an energy exchange.

However, in the event that the motor vehicle is connected to the charging device and the state of charge lies above the limit value, one embodiment provides that the energy store is discharged until the state of charge lies below the current limit value. This ensures that even a motor vehicle with a fully charged energy store or an energy store whose state of charge lies above the limit value is operated gently in the parking phase.

In one embodiment, said time profile is a probability indication. The limit value below which the state of charge is kept can be adjusted here continuously in terms of value as a function of the probability indication. If the time profile thus exhibits a fluctuation or change over time, a corresponding fluctuation or change can also be set for the limit value. "Continuously in terms of value" here means the difference from the continuous adjustment in terms of time, which results from the adaptation anyway. As an alternative to the continuous adjustment in terms of value, a stepped adjustment can be provided, that is to say several limit values or a group of limit values can be provided, between which it is possible to switch over in steps. As the probability indication is taken into account when setting the limit value, the state of charge can be increased by recharging the energy store if the probability indication for the non-energy requirement decreases, with the result that the increased state of charge provides the driver with an energy content if the probability that the motor vehicle is being used is realized or occurs. In other words, the state of charge is held at the limit value and not just at any state of charge below the limit value.

The time profile of the non-energy requirement can only indicate when the motor vehicle assumes the parking phase or the resting phase, that is to say when it is coupled to the charging device. Said probability indication can also be provided here. When the motor vehicle is not coupled to the charging device, but is used or is driving, it is advantageous to know how much energy the motor vehicle is then likely to require. A charging process specifically can then be carried out or adjusted accordingly before the end of the parking phase.

In one embodiment, a respective time profile of an energy requirement of the motor vehicle required from the energy store is also predicted for this purpose. It is thus estimated or indicated for several different points in time or for several different time intervals how much energy the motor vehicle is likely to need in each case. This can be specified as a power requirement, for example. In the event that the time profile of the non-energy requirement infringes the rest criterion, that is to say the motor vehicle will end the parking phase, the state of charge is set as a function of the predicted profile of the energy requirement by means of the charging device. Since the violation of the rest criterion signals an upcoming use of the motor vehicle. Since this is now known in advance by means of the predicted time profile of the non-energy requirement, a charging process can accordingly be initiated or started before the rest criterion is actually infringed. How much energy is then required for the upcoming operating phase of the motor vehicle (that is to say the interrupted parking phase) can then be determined on the basis of the energy requirement according to the predicted time profile of the energy requirement. The energy store thus does not have to be fully charged (to 100% SOC), but the energy exchange from the energy source into the energy store can be limited, specifically depending on the determined time profile of the energy requirement. This results in the advantage that a large amount of energy is not transferred into the energy store unnecessarily.

In one embodiment, the energy store is only charged here to the extent that, according to the predicted time profile of the non-energy requirement, for that time interval from that point in time from which the rest criterion is infringed, that is to say the parking phase is ended, to that point in time at which the rest criterion is satisfied again, so the operating phase is over and the parking phase begins again, the state of charge of the energy store is in a range from 30% to 70% or in a range from 40% to 60% averaged over time. During the operating phase, a state of charge will thus result which, on average over time over said time interval, lies within said limits or range. This prevents an unnecessarily extreme state of charge (for example above 90%) from occurring on average. This protects the energy store.

In one embodiment, however, a buffer value is added when the predicted time profile of the energy requirement is taken into account. The buffer value can, for example, be in a range of from 1 kWh to 20 kWh. In this way, a prognosis uncertainty that can be inherent in the time profile of the energy requirement can be compensated for or taken into account. The state of charge is thus higher than the expected predicted energy consumption. The buffer value is preferably specified in a user-specific and/or situation-specific manner and/or can be determined on the basis of the evaluation of the individual mobility pattern. In particular, the buffer value can be determined as a function of an individual mobility pattern of at least one predetermined user. A changeability or variance in a mobility pattern of the at least one user can therefore be compensated for or taken into account.

In one embodiment, a prediction model is operated for predicting the respective time profile (of the non-energy requirement and/or the energy requirement). Said prediction model is configured or adapted to the motor vehicle. To configure the prediction model, at least some of the following journey data are recorded for at least one journey: time data (relating to days of the week and/or times of journeys, for example), weather data (relating to weather conditions in which the motor vehicle was used, for example), route data (relating to starting locations and/or destinations and/or driving routes), consumption data (relating to an average consumption and/or a driving style and/or a loading of the motor vehicle, for example), charging data for recharging processes (relating to charging processes on at least one other charging device). In this way, the prediction model can be adapted to an actually existing intended use of the motor vehicle. Taking time data into account makes it possible here to predict said respective time profile directly. Taking weather data into account makes it possible to take into account a conditional, weather-dependent use. In addition, with the help of the weather data, an increased energy requirement for temperature control of the interior and the components of the motor vehicle (for example temperature control of the energy store itself) can be determined and thus taken into account in an energy requirement estimate. Taking route data into account makes it possible, if the destination of a user is known, to see whether they will use the motor vehicle. In addition, the expected driving distances can be determined from this, which are the basis for the expected energy consumption. Taking consumption data into account makes it possible to predict the energy requirement. Taking charging data into account makes it possible to plan a recharging process at a different charging device.

In one embodiment, said journey data are recorded by means of vehicle-related recording. In other words, the use of the motor vehicle, which can be carried out by several users, is taken into account. Additionally or alternatively, person-related recording can take place so that a specific user pattern of a respective particular user can be taken into account. In this case, journey data for the user can also be recorded for journeys using at least one other motor vehicle. Therefore, charging control for several different motor vehicles that the user would like to use can thus be provided for said user. Said journey data make it possible to configure the prediction model on the basis of historical or past driving processes that have been observed.

In one embodiment, at least a portion of the journey data is recorded during at least one journey that is carried out using a different motor vehicle, and the journey data recorded in this way are normalized by virtue of them being related to an average consumption and/or being determined per predetermined route unit (for example per kilometer) and/or for different road classes (for example interstate, country road, city) and/or road type (good road state/poor road state). There is therefore a larger database available. If a portion of the journey data is determined here using a motor vehicle that has a different engine and/or a different weight, for example, normalization can ensure that an energy requirement for the motor vehicle that is connected to the charging device is determined correctly. Taking route units and/or road classes and/or road types into account makes it possible, given a planned driving route of the motor vehicle, to determine what energy requirement it will likely have for this. The planned driving route can be received from a navigation device in the form of navigation data, for example.

In one embodiment, the prediction model additionally adapts the respective predicted time profile as a function of at least some of the following situation data. It is possible to take into account a mobility matrix, which describes a mobility pattern or movement pattern of at least one user of the motor vehicle, that is to say indicates the times at which the respective user travels from which starting point to which destination. It is possible to take into account booking data for the motor vehicle, which indicate when at least one user announced or ordered the use of the motor vehicle. It is possible to take into account traffic data of road traffic, which can indicate whether a certain driving route can be used and/or at what probable average speed the driving route can be used. It is possible to take into account weather forecast data, which can indicate the weather or the weather conditions that are likely to prevail. This is particularly advantageous with the combination that it is also determined with the journey data the weather or the weather conditions in which the motor vehicle is used and/or how high the additional energy requirement for conditioning the interior is. Personal activity data of at least one user of the motor vehicle can be determined, wherein such activity data can be determined, for example, by means of a mobile terminal device (for example smartphone and/or tablet PC and/or smart watch) or generally what is known as a "wearable device". The activity data can describe a current activity and/or a planned activity of the respective user, wherein the activity data can include at least one of the following data types: calendar data (for example at least one appointment of the user), alarm clock data (for example time information for getting up and/or going to bed), movement data (for example a movement towards or away from the motor vehicle), an indication of the proximity to the motor vehicle (that is to say how far the user is from the motor vehicle), sleep phase information (that is to say when the user is sleeping). In addition to the historical journey data described, the situation data thus takes into account information that describes the current situation and/or a future and/or planned situation. It is therefore possible, for example, to react to a change in a daily rhythm. This is also possible without interaction with the user.

In one embodiment, data from a respective wearable of the at least one user are taken into account to determine the intended vehicle non-use of the motor vehicle with regard to at least one predetermined user. Such a wearable can be a mobile terminal device, such as a smartphone or a tablet PC or a smartwatch, for example, or it can be a device worn on the body, for example, such as a fitness bracelet, or a piece of jewelry with a radio device, for example. The wearable can be used to record the whereabouts and/or movement pattern of the user and, from this, infer an upcoming use or non-use of the motor vehicle (for example based on a distance and/or a movement with respect to the motor vehicle). For this purpose, said data can include geoposition data and/or date data. The data can also be said activity data in order to adapt to the respective time profile.

In one embodiment, in the event that a recharging process is detected while the motor vehicle is in use, the prediction model is corrected on the basis of the detected recharging process. The recharging process is, in particular, an unplanned or unforeseen or unpredicted recharging process. There was thus a forecast error here. By correcting the prediction model, said prediction errors can be reduced for further predictions of time profiles. The prediction model can be implemented, for example, on the basis of a machine learning method, that is to say, for example, on the basis of a neural network and/or a decision tree and/or a regression model and/or a deep learning method. Additionally or alternatively, a statistical method (for example a Markov chain and/or a probabilistic network) can be taken as a basis. With these methods, when a prediction error is detected, such as when a recharging process is detected, for example, the prediction model can be adapted as a function of a detected prediction error.

In one embodiment, a user input is received via a user interface (for example an Internet portal (web portal)) and/or a user program (for example application software for a mobile terminal device). A planned use of the motor vehicle is announced by the user input. In other words, a user can thus explicitly indicate when he would like to use the motor vehicle. The predicted time profile of the non-energy requirement is then corrected according to the user input. As a result, a user can advantageously announce an exceptional situation and it is then ensured that the energy store of the motor vehicle has a corresponding state of charge. Depending on the user input, the time profile of the energy requirement can also be adjusted if the user input also defines a destination and/or a route, for example.

In one embodiment, the prediction model is operated by a backend apparatus. Such a backend apparatus is an apparatus outside of the vehicle, which, in particular, can also be operated at a distance from the charging device. For example, said backend apparatus may be a computer or a computer network. The backend apparatus can be implemented, for example, as a server of the Internet or a cloud device. Carrying out the method using a backend apparatus has the advantage that data sources that are available outside of the motor vehicle are used.

Said backend apparatus is also part of an aspect of the invention. Said backend apparatus has a computing device, which is set up to carry out an embodiment of the method according to the invention. The computing device can be implemented on the basis of at least one microprocessor. The method can be implemented, for example, as a program code for the computing device. The program code can have program instructions, which, when executed by the computing device, carry out the embodiments of the method according to the invention. The program code can be stored in a data memory or a non-volatile storage medium of the computing device. The backend apparatus can be coupled to the charging device, for example via a communication connection, in order to control the charging device. The communication device can be implemented on the basis of an Internet connection. The communication connection can comprise a radio-based connection, as it can be implemented, for example, on the basis of a cellular radio connection and/or WLAN connection (WLAN—Wireless Local Area Network).

BRIEF DESCRIPTION OF THE DRAWINGS

Exemplary embodiments of the invention are described below. In this respect.

DETAILED DESCRIPTION OF THE PREFERRED EMBODIMENTS

The exemplary embodiment explained below is a preferred embodiment of the invention. In the exemplary embodiment, the described components of the embodiment each represent individual features of the invention that should be considered independently of one another, and that each also develop the invention independently of one another and can therefore also be considered to be part of the invention, either individually or in a combination other than that shown. Furthermore, the embodiment described may also be supplemented by further features of the invention that have already been described.

In the figures, elements with the same function are each provided with the same reference signs.

Figure 1:
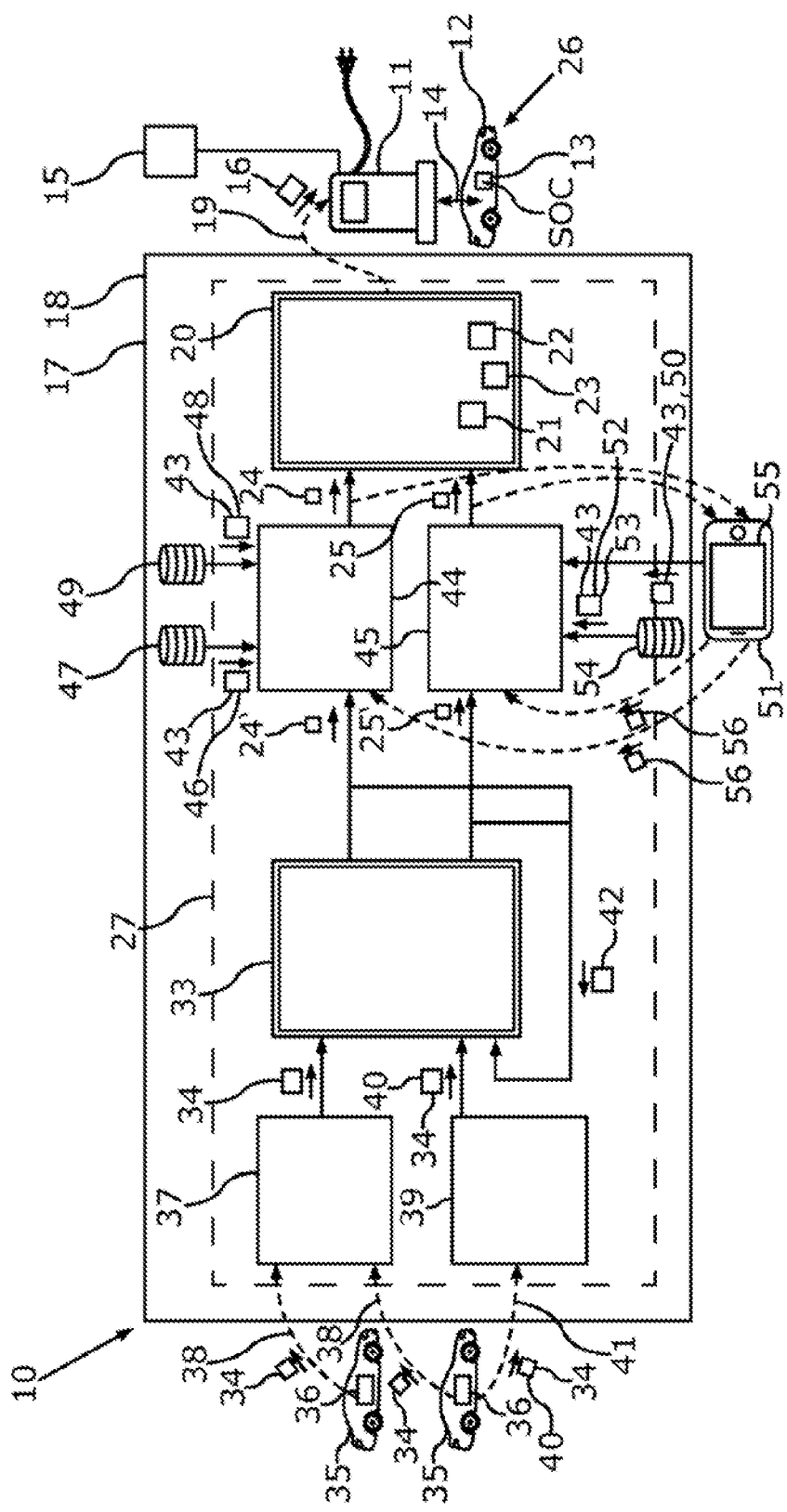
FIG. 1 shows a schematic illustration of a system architecture with an embodiment of the backend apparatus according to the invention.

FIG. 1 shows a system architecture 10, by means of which at least one charging device 11 can be controlled. Several charging devices can also be controlled in the manner described in the following text. In the following text, only one charging device 11 is described as an example. The charging device 11 can be, for example, a charging column or a charging station. The charging device 11 can also be integrated into the motor vehicle 12.

Owing to the charging device 11, in the case of a motor vehicle 12, the electrical energy store 13 of said motor vehicle can be recharged by means of an energy exchange 14. The energy store 13 can be, for example, a high-voltage battery, that is to say a battery that can generate a DC voltage of more than 60 V. The energy store 13 can be what is known as a traction battery of the motor vehicle 12, by means of which an electric drive unit of the motor vehicle 12 can be operated. For the energy exchange 14, the charging device 11 can be connected to an electrical energy source 15. The energy source 15 can be a public electricity grid and/or a system for regenerative energies, for example a photovoltaic system. In general, the charging device 11 is thus connected to an electrical energy source.

The energy exchange 14 can be controlled in the charging device 11 by control signals 16, which can be generated by a control apparatus 17. The control apparatus 17 can be designed, in particular, as a backend apparatus 18, that is to say as an Internet server or cloud device for the Internet, for example. The control signals 16 can be transmitted from the backend apparatus 18 to the charging device 11 via a communication connection 19. The communication connection 19 can be based, for example, on an Internet connection and/or a radio connection.

The backend apparatus 18 can be used to implement charging control 20, which provides a charging strategy for the energy store 13 of the motor vehicle 12, in which it can also be provided that a state of charge of the energy store 13 is maintained if the motor vehicle 12 will not be used within a predetermined next period of time. As a result thereof, it can be provided that the state of charge is kept below a predetermined limit value 21. Said limit value indicates for a storage type of the energy store 13 that the energy store 13 is operated more gently when the state of charge is below the limit value 21 as long as the motor vehicle 12 is not in use, that is to say no energy is drawn from the energy store 13. The limit value 21 can be dependent on storage technology of the energy store 13. One possible storage technology is lithium-ion storage technology. The limit value 21 can be taken from specialist publications, for example.

The state of charge SOC can be set here by the energy exchange 14. As long as a rest criterion 22 that indicates that the motor vehicle 12 will not be used within a next time interval 23 is satisfied, the state of charge is kept below the limit value 21. In order to be able to identify or predict whether the motor vehicle 12 will be used for a future period of time, in particular for the next future time interval 23, a predicted time profile 24 for an energy requirement E and a predicted time profile 25 for a non-energy requirement N can be used as a basis in the backend apparatus 18.

Figure 2:
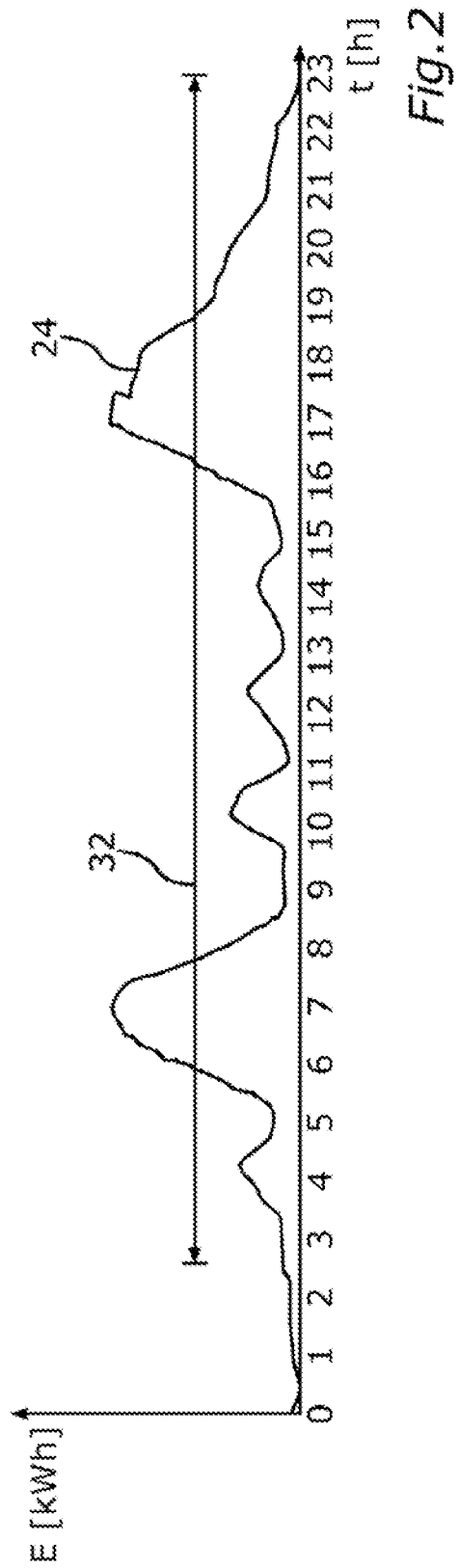
FIG. 2 shows a diagram with a predicted time profile of an energy requirement.

FIG. 2 shows an exemplary time profile 24 for an energy requirement E. The energy requirement E in the unit kilowatt hours (kWh) is illustrated over time t (specified in hours h of the day, that is to say from 0 to 24 hours). This therefore also results in a power requirement of the motor vehicle 12. The energy requirement E indicates the energy required from the energy store 13. This can be the energy that the motor vehicle 12 needs while driving or for driving.

Figure 3:
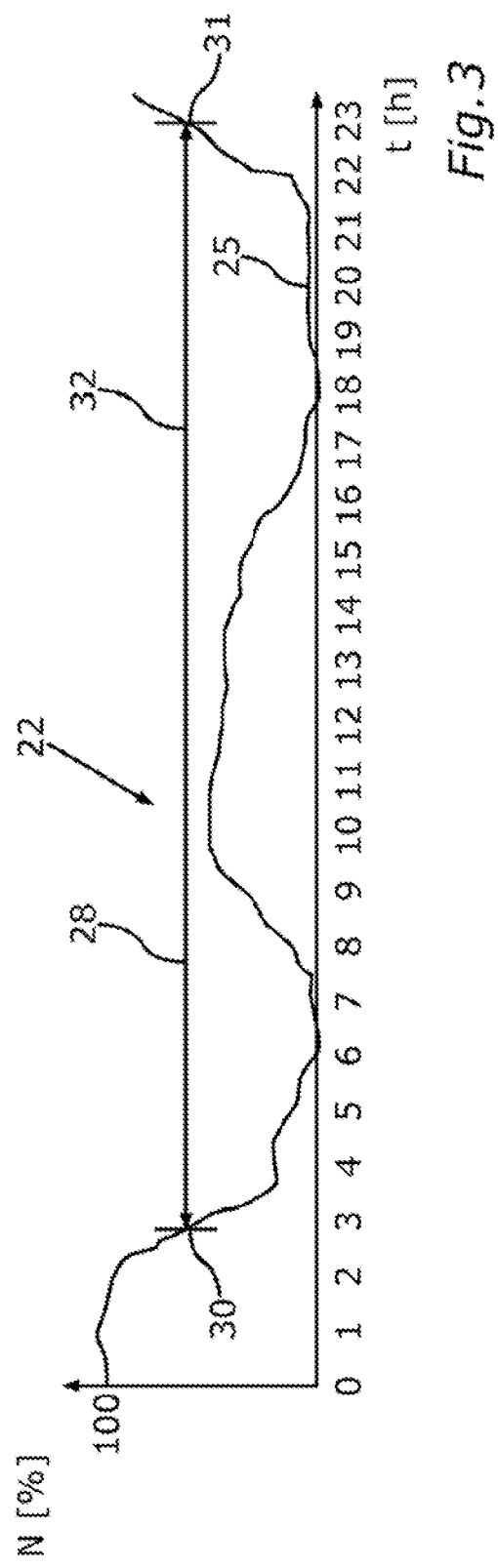
FIG. 3 shows a diagram with a predicted time profile of a non-energy requirement.

FIG. 3 shows, by way of example, a time profile 25 for the non-energy requirement N. This can be a probability indication that can be expressed, for example, in percent. The indication is again over the time t in hours h of the day. The non-energy requirement N can indicate the probability with which the motor vehicle 12 is in a parking phase 26 (see FIG. 1) and is coupled to the charging device 11 or the energy source 15 so that the charging control 20 can be carried out or implemented. If, on the other hand, there is no parking phase 26 but an operating phase, the motor vehicle 12 is decoupled from the charging device 11 or the energy source 15, so that no energy exchange 14 for setting the state of charge SOC is possible.

Figure 4:
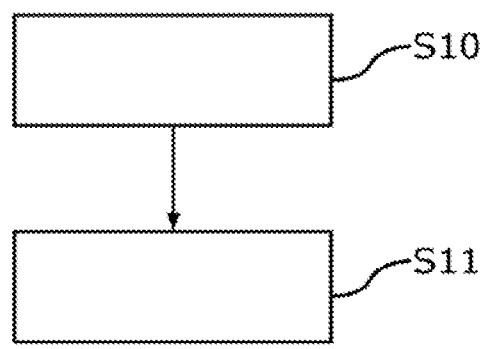
FIG. 4 shows a flowchart of one embodiment of the method according to the invention.

FIG. 4 illustrates a method that can be carried out in the backend apparatus 18 by a computing device 27 (see FIG. 1) in order to implement the charging control 20. In a step S10, the future time profile 25 of the non-energy requirement N and the time profile 24 of the non-energy requirement N can be predicted. In a step S11, the state of charge SOC of the energy store 13 can then be kept below the limit value 21 by means of the charging device 11, regardless of the availability of a charging power of the energy source 15, if the predicted time profile 25 of the non-energy requirement N satisfies the rest criterion 22 for a predetermined next time interval 23. The rest criterion can, for example, state that the time profile 25 for the non-energy requirement N must lie above a predetermined threshold value 28 so that it is assumed that the motor vehicle 12 is actually coupled to the charging device 11 for the respective time t. Provision can also be made for it to be assumed that the time profile 25 for the future time interval 23 from the current point in time must lie above the threshold value 28.

FIG. 3 illustrates in this respect how, between a point in time 30 at which the time profile 25 falls below the threshold value 28 and a point in time 31 at which the time profile 25 exceeds the threshold value 28 again, a time interval 32 results, for which it must be assumed by the charging control 20 that the motor vehicle 12 is in an operating phase and can therefore only draw energy from the energy store 13. Provision can be made for the state of charge SOC to be set by the energy exchange 14 before the point in time 30 so that, according to the time profile 24 for the energy requirement E (FIG. 2), the result is a medium state of charge SOC, which lies in a range of from 30% to 70% state of charge, in particular in a range of from 40% to 60%. For this purpose, the energy requirement E for the time interval 32 can be determined from the time profile 24.

FIG. 1 further illustrates how the time profiles 24, 25 can be predicted.

Preliminary time profiles 24', 25' can initially be determined by means of a prediction model 33. The prediction model 33 can be configured on the basis of historical journey data 34. The at least one motor vehicle 35 can be the motor vehicle 12, but it can also be one or more other motor vehicles. Each of the motor vehicles 35 can likewise have an energy store 36, so that charging processes also result for the at least one motor vehicle 35. The journey data 34 can be recorded from the at least one motor vehicle 35 by means of data recording 37 which, for example, can record the journey data 34 on the basis of communication via a respective communication connection 38 to the at least one motor vehicle 35. In addition, charging data 40 relating to charging processes of the at least one motor vehicle 35 can also be recorded as journey data by data recording 39. Such charging data 40 can be received from the respective motor vehicle 35 and/or from a charging station. A corresponding communication connection 41 can be provided for this purpose. The communication connections 38, 41 can each include, for example, an Internet connection and/or a cellular radio connection and/or a WLAN radio connection.

On the basis of the recorded journey data 34, the prediction model 33 can be formed, for example, as a statistical model and/or as a model based on a machine learning method. The preliminary time profiles 24', 25' can then be compared with actually observed time profiles, from which error data 42 can be generated, which can be used to correct or improve the prediction model 33.

In addition to the historical journey data, however, current situation data 43 can also be taken into account, on the basis of which a current situation of the motor vehicle 12 can be determined. A respective correction 44, 45 for the preliminary time profile 24', 25' can then be carried out from this, from which the final estimated or predicted time profile 24, 25 then results in each case. For example, weather forecast data 46 from a weather station 47 and/or traffic data 48 from a traffic observation system 49 can be used as situation data 43. Weather data and/or traffic data are preferably used to determine an increased energy requirement due to (for example low or high) outside temperatures and/or due to traffic congestion. Activity data 50, which can describe an activity of a user of the motor vehicle 12, can also be used. These can be received, for example, from a mobile terminal device 51, which can be, for example, a smartphone and/or a tablet PC and/or a smartwatch belonging to the user. A mobility matrix 52 and/or booking data 53 from a corresponding data source 54 can also be used. For example, a user interface 55 can also be provided by means of the mobile terminal device 51, through which user interface a user input 56 can be received, through which the user can expressly indicate when he would like to use the motor vehicle 12. A correction 44, 45 for the time profiles 24', 25' can also be derived or determined from this.

The need to keep the state of charge low when a vehicle battery is not in use in order to avoid wear shows that the conditions when the vehicle is not driving are important to ensure the battery service life, especially with smaller batteries. To do this, it is necessary to know well in advance (several hours or days) before starting the journey when and how much energy is required or at least to know when no energy is required.

Current charging strategies of the prior art do not take into account the service life of the batteries when choosing the point in time for the charging process. Numerous electric vehicles are charged immediately after plugging in the charging plug. There are also approaches in which the user can individually determine when the vehicle can be charged. There are also smart grid solutions in which the time of charging is charged depending on the electricity supply or the electricity price (controlled charging).

During the charging process, the charging current is selected in such a way that the service life of the energy store is impaired as little as possible during the charging process.

Due to the limited range of electric vehicles, however, users want to have as high an energy content as possible at the beginning of the journey (to avoid getting stranded or due to the limited availability of public charging infrastructure).

It would therefore not be beneficial for the service life of the battery store to charge the energy store after the end of the journey and to park the vehicle with a high SOC so that the driver has a full energy store at the beginning of the journey. Instead, it is necessary, if possible, to fully charge the energy store shortly before the journey and to keep the store at a low SOC level for as long as possible.

Determining the energy requirement well before the start of the journey is a problem. Research shows that less than 25% of drivers use a navigation system. Drivers are therefore often not ready to input the destination of the journey (especially in known areas). For a charging strategy for electric vehicles, however, the driver would have to be ready to input the next destination at the end of the journey.

There is therefore a method for learning the starting locations and destinations of the user on the basis of logged journey data. These methods are suitable for the problem relating to charging vehicle batteries so as to extend the service life thereof. However, preferred starting locations and destinations can often only be reliably determined from private individuals. In the commercial sector (for example tradesmen, representatives, company vehicles, etc.), such repeated and preferred starting locations and destinations cannot be determined, with the result that predictive charging control should be implemented differently for these user groups.

Approaches that predict when no energy is required for the vehicle are implemented.

The following disadvantages can be eliminated:
- energy requirement of the entire route only known after inputting the navigation data
- energy requirement of the entire route only known after the most likely route has been identified
- user identification is required to identify the most likely overall route
- controlled recharging of the energy store (by the user, smart grid) without taking battery service life into account
- Non-existent strategy for keeping the energy store at a low SOC level (below a predetermined limit value).

The described server-based system architecture 10 uses various data sources, processes the raw data and uses machine learning methods to predict the following variables (see FIG. 2):
- probable time profile of the energy requirement
- time profile of the probability of a non-energy requirement (continuously for the next hours/days)

Two prediction variants are possible, a driver-specific variant (primarily personal data of the driver are used for this purpose) and a vehicle-specific variant (especially suitable for fleet applications).

Intelligent control of the charging strategy is used on the basis of the predicted values. For this purpose, a wireless or wired communication connection and interface with the control unit of the charger of the electric vehicle is necessary. Individual components of the overall system are described below.

The following application in the form of a charging strategy for lithium-ion batteries is therefore possible. The charging strategy uses the predicted profile of the energy requirement in order to have fully charged the energy store at the expected starting time. The point in time at which the charging process is to be started is calculated depending on the current SOC of the battery so that the energy store is fully charged. In this case, the power with which the electric vehicle can be charged (for example household socket 3 kW, wall charging station with 11 kW or 22 kW) must be known.

If the expected journey is very short, the energy store is only fully charged to such an extent that the destination can be reached with a medium SOC value (for example 50%).

The probability of the non-energy requirement is used to determine the SOC level during the parking process/vehicle standstill. If there is a higher probability of the non-energy requirement (for example at night), the SOC level is left at a low level in order to impair the service life of the energy store as little as possible. If the probability of the non-energy requirement decreases, the SOC level is increased by recharging the energy store, so that the driver has a certain energy content available if he unexpectedly wants to drive off anyway.

In the case of a smart grid connection of the vehicle, it is also possible to discharge the energy store after the end of the journey (for example in decentralized home stores) in order to lower the SOC level if the energy store is very full after the end of the journey and no journey is expected for the next few hours.

Since the predicted values are provided with a certain degree of uncertainty in the prognosis, a certain safety buffer is taken into account in the charging strategy. The vehicle is thus already fully charged a certain period of time before the start of the journey and the SOC level is higher than the expected, predicted energy consumption.

Each time a vehicle driver makes a journey, journey data 34, such as the start of the journey, the outside temperature (using weather data), the duration of the journey, the route and the energy consumption of the vehicle (electrical or conventional) can be recorded. Said data can be recorded using GPS data and available OBD data for conventional vehicles. In the case of electric vehicles, there is an interface to the communication network of the vehicle so that the data can be recorded. The data are transmitted to a backend via wireless communication. Here, the data are recorded in a manner related to persons (for private vehicles) or vehicles (for fleet vehicles)

The recorded energy consumption of the vehicle is normalized so that the energy consumptions of different vehicles can be compared. For this purpose, the energy consumption per route unit can be easily divided by the average consumption of the vehicle. Alternatively, the route-dependent average energy consumption depending on the road class or the road type can also be used for normalization. For this purpose, it must be determined which route sections have been covered with which road class or type with the aid of digital map data. This can happen during the journey or in the backend with the recorded journey trajectories In addition, all charging processes are recorded (duration, amount of energy, point in time).

In addition to the recorded sources, other data sources (link with backend required) can optionally be used to increase the accuracy. Examples:
mobility pattern: origin-destination matrix/prediction of the probable destinations by evaluating the individual driver behavior (with driver-specific recording)
driver's appointment calendar (driver-specific recording)
booking system of the fleet (vehicle-specific recording)
traffic forecast/traffic patterns (to correct the predicted energy requirement)
weather conditions (to correct the predicted energy requirement)
data from wearables/smartphones (to correct the probability of non-requirement in the case of driver-specific recording):
  analysis of sleep phases
  alarm clock parametrization
  current distance from the vehicle For the prediction model 33, when which energy consumption is required is recorded statistically. The statistical evaluation is carried out hourly and on a weekday. Using statistical methods (Markov chains, probabilistic networks, to name only examples) and machine learning methods (neural networks, decision trees, regression models, deep learning methods, to name only examples), the following values are predicted:
energy requirement
probability of non-requirement of the electric vehicle (non-energy requirement)

The time profile of the values is calculated for a parametrizable prediction horizon (for example 24 h). The prediction is based on the recorded data at points in time when the vehicle is used and the recorded energy consumption values. The prediction is therefore possible without the input of user data or the input of navigation data.

In a second step, the prediction is corrected depending on the additional data sources available. For this purpose, the energy consumption is corrected depending on the vehicle used, the expected weather conditions and the expected traffic conditions.

With driver-specific recording, the probability of non-requirement is corrected depending on the user-specific data available (for example through knowledge of smartphone data such as, for example, the alarm clock, through knowledge of the appointment calendar or through evaluation of the personal mobility pattern).

The prediction model is improved by evaluating recharging processes en route (at non-preferred charging columns). For example, whether the recharging process would have been avoided if the store had already been fully charged at the start of the journey is analyzed. If an inaccurate forecast is the cause of the recharging process, the forecast model is adjusted accordingly. For this purpose, methods of reinforcement learning are used, for example.

A user interface (user interface 55, for example in the form of a web portal, smartphone and/or application software) provides the user with a display of the predicted values. The system predicts the energy requirement and the probability of a non-energy requirement independently of the user inputs. However, in exceptional situations (for example when going on vacation at 3:00 a.m.), the user also has the option of specifying a required start of the journey in order to ensure that the energy store is sufficiently charged in these exceptional situations.

Since it is a learning system and the forecast is increasingly being adapted to user behavior, user inputs are useful in the learning phase.

This results in the following options:
prediction of a probability for the non-energy requirement to determine the lowest possible SOC level during the parking process of electric vehicles,
strategy for charging the energy store as late as possible before starting the journey,
charging management to extend the service life of the energy store without the need for user data or user specifications,
linking charging management with smartphones or wearables to determine whether a vehicle is required The approaches described can also be used in the following areas:
avoidance of battery aging,
preconditioning of air conditioning,
fleet management for fleet vehicles,
smart grid applications: consideration of the energy requirement of electric vehicles in the case of decentralized stores; energy recovery from electric vehicles in decentralized house stores.

Overall, the example shows how an aspect of the invention can provide the prediction of a probability an electric vehicle will not be required in order to extend the battery service life of the electric vehicle.

The invention claimed is:

1. A method for predictive charging control for an electrical energy store of a motor vehicle, wherein an energy exchange between the energy store and an electrical energy source is controlled by a charging device, the method comprising:
predicting a future time profile of a non-energy requirement resulting from a respective parking phase of the motor vehicle;
defining a predetermined rest criterion for a predetermined next time interval;
comparing a state of charge of the energy store to a limit value; and
keeping state of charge of the energy store below the limit value by the charging device if the predicted future time profile of the non-energy requirement satisfies the predetermined rest criterion for the predetermined next time interval, wherein a time profile of an energy requirement of the motor vehicle required from the energy store is predicted and, in the event that the predicted future time profile of the non-energy requirement, infringes the rest criterion and thereby an upcoming use of the motor vehicle is signaled, the state of charge is set as a function of the predicted time profile of the energy requirement by the charging device.

2. The method as claimed in claim 1, wherein the predicted future time profile of the non-energy requirement for respective points in time indicates that the motor vehicle does not require any electrical energy from the energy store for a predetermined next period of time based on the respective point in time and/or will remain coupled to the charging device and/or the energy source.

3. The method as claimed in claim 1, wherein, in the event that the state of charge lies above the current limit value, the energy store is discharged.

4. The method as claimed in claim 1, wherein the predicted future time profile is a probability indication and the limit value is adapted continuously in terms of value or in steps as a function of the probability indication.

5. The method as claimed in claim 1, wherein the energy store is only charged to the extent that, for a time interval that extends from a point in time from which the rest criterion is infringed to a point in time at which the rest criterion is satisfied again, the state of charge lies in a range from 30 percent to 70 percent or in a range from 40 percent to 60 percent averaged over time.

6. The method as claimed in claim 1, wherein, when taking into account the predicted time profile of the energy requirement, a buffer value is added, which is determined as a function of an individual mobility pattern of at least one predetermined user.

7. The method as claimed in claim 1, wherein a prediction model is operated for the prediction of the respective time profile and at least some of the following journey data are recorded to configure the prediction model for at least one journey: time data, weather data, route data, consumption data, charging data for recharging processes.

8. The method as claimed in claim 7, wherein the journey data are determined by vehicle-related recording and/or person-related recording.

9. The method as claimed in claim 7, wherein the recording of at least a portion of the journey data takes place during at least one journey that is carried out using another motor vehicle and the journey data recorded thereby are normalized by virtue of them being related to an average consumption and/or being determined per predetermined route unit and/or road class and/or road type.

10. The method as claimed in claim 7, wherein the respective predicted time profile is adapted as a function of at least some of the following situation data:

a mobility matrix of at least one user of the motor vehicle, booking data for the motor vehicle, traffic data of road traffic, weather forecast data, personal activity data of the at least one user, which describe a current activity and/or a planned activity, wherein the activity data include at least one of the following data types: calendar data, alarm clock data, movement data, an indication of proximity to the motor vehicle, sleep phase information.

11. The method as claimed in claim 7, wherein, in the event that a recharging process is detected while the motor vehicle is in use, the prediction model is corrected on the basis of the detected recharging process.

12. The method as claimed in claim 1, wherein data from a respective wearable of the at least one user are taken into account to determine the intended vehicle non-use of the motor vehicle with regard to at least one predetermined user.

13. The method as claimed in claim 1, wherein a user input, through which a planned use of the motor vehicle is announced, is received via a user interface and the predicted future time profile of the non-energy requirement is corrected according to the user input.

14. A backend apparatus having a computing device, characterized in that the computing device is set up to carry out a method as claimed in claim 1.

15. The method as claimed in claim 5, wherein, when taking into account the predicted time profile of the energy requirement, a buffer value is added, which is determined as a function of an individual mobility pattern of at least one predetermined user.

16. The method as claimed in claim 8, wherein the recording of at least a portion of the journey data takes place during at least one journey that is carried out using another motor vehicle and the journey data recorded thereby are normalized by virtue of them being related to an average consumption and/or being determined per predetermined route unit and/or road class and/or road type.

* * * * *